United States Patent [19]

Tompane

[11] Patent Number: 4,868,677
[45] Date of Patent: Sep. 19, 1989

[54] ELECTROLUMINESCENT LINE SCANNER WITH MOVEABLE FILTER

[75] Inventor: Richard B. Tompane, Mountain View, Calif.

[73] Assignee: Mirus Corporation, Los Altos, Calif.

[21] Appl. No.: 143,495

[22] Filed: Jan. 13, 1988

[51] Int. Cl.$^4$ ............................................. H04N 1/21
[52] U.S. Cl. ..................................... 358/302; 358/75; 346/110 R
[58] Field of Search ............... 346/108, 107 R, 110 R, 346/110 V, 76 L; 358/302, 300, 78, 75

[56] References Cited

U.S. PATENT DOCUMENTS

| | | | |
|---|---|---|---|
| 4,438,453 | 3/1984 | Alston | 358/75 |
| 4,467,369 | 8/1984 | Alston | 358/75 |
| 4,769,715 | 9/1988 | Feldman | 346/110 R |

*Primary Examiner*—C. L. Albritton
*Assistant Examiner*—Mark Reinhart

*Attorney, Agent, or Firm*—Cushman, Darby & Cushman

[57] ABSTRACT

An image recording system includes an electro-optic image section having a luminescent display device, such as a high-resolution monochrome cathode ray tube (CRT), that successively directs its light output through a red, a green, and blue filters to expose recording film contained within a camera. The recording film can take the form of positive roll film that is processed into slides or self-developing film units. The CRT is controlled to sweep a scan line at specified line positions while modulating the output light in a digital manner and repeat the line sweep until all pixel positions for that line are properly exposed. After all lines for a particular color are imaged, the filter is changed to the next color to be imaged and the process repeated until all scan lines for the different colors are completed. The system allows very precise exposure control to create developed images having fine gradation in color density and hue.

9 Claims, 13 Drawing Sheets

| INDEX | RED | GRN | BLU |
|---|---|---|---|
| 0 | 0 | 0 | 0 |
| 1 | 2 | 1 | 3 |
| 2 | 4 | 2 | 7 |
| 3 | 7 | 4 | 11 |
| 4 | 10 | 6 | 15 |
| 5 | 13 | 7 | 20 |
| 6 | 16 | 9 | 24 |
| ... | ... | ... | ... |
| 11 | 28 | 25 | 55 |
| ... | ... | ... | ... |
| 14 | 39 | 35 | 70 |
| 15 | 42 | 38 | 75 |
| ... | ... | ... | ... |
| 26 | 83 | 65 | 135 |
| ... | ... | ... | ... |
| 34 | 114 | 90 | 190 |
| ... | ... | ... | ... |
| 72 | 275 | 240 | 420 |
| ... | ... | ... | ... |
| 243 | 1129 | 650 | 1750 |
| ... | ... | ... | ... |
| 253 | 1189 | 713 | 1833 |
| 254 | 1194 | 716 | 1841 |
| 255 | 1200 | 720 | 1850 |

FIG. 6

| (SOL) | NDX$_1$ | NDX$_2$ | NDX$_3$ | NDX$_4$ | NDX$_5$ | .... | NDX$_{n-2}$ | NDX$_{n-1}$ | NDX$_n$ | (EOL) |

FIG. 7

| (XX) | 11 | 14 | 26 | 26 | 26 | 26 | 26 | 15 | 11 | .... | 72 | 243 | 243 | 72 | 34 | 11 | 11 | (00) |

FIG. 7A

| (XX) | 11 | 14 | (CC) | 07 | 26 | 15 | 11 | .... | 72 | 243 | 243 | 243 | 243 | 72 | 34 | 11 | 11 | (00) |

FIG. 7B

| INPUT DATA | 11 | 14 | 26 | 26 | 26 | 26 | 26 | 26 | 15 | 11 | ... | 72 | 243 | 243 | 72 | 34 | 11 | 11 |
|---|---|---|---|---|---|---|---|---|---|---|---|---|---|---|---|---|---|---|
| SCAN COUNT | 28 | 39 | 83 | 83 | 83 | 83 | 83 | 83 | 42 | 28 | ... | 275 | 1129 | 1129 | 275 | 114 | 28 | 28 |

FIG. 8

| 1 | 1 | 1 | 1 | 1 | 1 | 1 | 1 | 1 | 1 | ... | 1 | 1 | 1 | 1 | 1 | 1 | 1 |
|---|---|---|---|---|---|---|---|---|---|---|---|---|---|---|---|---|---|

FIG. 8A

| SCAN COUNT | 27 | 38 | 82 | 82 | 82 | 82 | 82 | 82 | 41 | 27 | ... | 274 | 1128 | 1128 | 274 | 113 | 27 | 27 |
|---|---|---|---|---|---|---|---|---|---|---|---|---|---|---|---|---|---|---|

FIG. 8B

| 2 | ... | 27 | 28 | 29 | ... | 39 | 40 | 41 | 42 | 43 | ... | 1128 | 1129 |
|---|---|---|---|---|---|---|---|---|---|---|---|---|---|
| 1 | | 1 | 1 | 0 | | 0 | 0 | 0 | 0 | 0 | | 0 | 0 |
| 1 | | 1 | 1 | 0 | | 0 | 0 | 0 | 0 | 0 | | 0 | 0 |
| 1 | | 1 | 1 | 1 | | 1 | 1 | 1 | 1 | 1 | | 0 | 0 |
| 1 | | 1 | 1 | 1 | | 1 | 1 | 1 | 1 | 1 | | 0 | 0 |
| 1 | | 1 | 1 | 1 | | 1 | 1 | 1 | 1 | 1 | | 1 | 1 |
| 1 | | 1 | 1 | 1 | | 1 | 1 | 1 | 1 | 1 | | 1 | 1 |
| 1 | | 1 | 1 | 1 | | 1 | 1 | 1 | 1 | 1 | | 0 | 0 |
| ⋮ | | ⋮ | ⋮ | ⋮ | | ⋮ | ⋮ | ⋮ | ⋮ | ⋮ | | ⋮ | ⋮ |
| 1 | | 1 | 1 | 0 | | 0 | 0 | 0 | 0 | 0 | | 0 | 0 |
| 1 | | 1 | 1 | 1 | | 1 | 1 | 1 | 1 | 1 | | 0 | 0 |
| 1 | | 1 | 1 | 1 | | 1 | 1 | 1 | 1 | 1 | | 0 | 0 |
| 1 | | 1 | 1 | 1 | | 1 | 1 | 1 | 1 | 1 | | 0 | 0 |
| 1 | | 1 | 1 | 1 | | 1 | 1 | 1 | 1 | 1 | | 0 | 0 |
| 1 | | 1 | 1 | 1 | | 1 | 1 | 1 | 1 | 1 | | 0 | 0 |
| 1 | | 1 | 1 | 1 | | 1 | 1 | 1 | 1 | 1 | | 0 | 0 |
| 1 | | 1 | 1 | 1 | | 1 | 1 | 1 | 1 | 1 | | 0 | 0 |
| 1 | | 1 | 1 | 1 | | 1 | 1 | 1 | 1 | 1 | | 0 | 0 |
| 1 | | 1 | 1 | 1 | | 1 | 1 | 1 | 1 | 1 | | 0 | 0 |
| 1 | | 1 | 1 | 0 | | 0 | 0 | 0 | 0 | 0 | | 0 | 0 |

| INPUT DATA | 11 | 14 | 26 | 26 | 26 | 26 | 26 | 26 | 26 | 15 | 11 | ... | 72 | 243 | 243 | 72 | 34 | 11 | 11 |
|---|---|---|---|---|---|---|---|---|---|---|---|---|---|---|---|---|---|---|---|
| SCAN COUNT | 28 | 39 | 83 | 83 | 83 | 83 | 83 | 83 | 83 | 42 | 28 | ... | 275 | 1129 | 1129 | 275 | 114 | 28 | 28 |

FIG. 9A

| | | | | | | | | | | | | | | | | | | | |
|---|---|---|---|---|---|---|---|---|---|---|---|---|---|---|---|---|---|---|---|
| 28 | 1 | 1 | 1 | 1 | 1 | 1 | 1 | 1 | 1 | 1 | 1 | ... | 1 | 1 | 1 | 1 | 1 | 1 | 1 |
| 11 | 0 | 1 | 1 | 1 | 1 | 1 | 1 | 1 | 1 | 1 | 1 | ... | 1 | 1 | 1 | 1 | 1 | 0 | 0 |
| 3 | 0 | 0 | 1 | 1 | 1 | 1 | 1 | 1 | 1 | 1 | 0 | ... | 1 | 1 | 1 | 1 | 1 | 0 | 0 |
| 41 | 0 | 0 | 1 | 1 | 1 | 1 | 1 | 1 | 1 | 0 | 0 | ... | 1 | 1 | 1 | 1 | 0 | 0 | 0 |
| 31 | 0 | 0 | 1 | 1 | 1 | 1 | 1 | 1 | 1 | 0 | 0 | ... | 1 | 1 | 1 | 1 | 0 | 0 | 0 |
| 161 | 0 | 0 | 0 | 0 | 0 | 0 | 0 | 0 | 0 | 0 | 0 | ... | 0 | 1 | 1 | 0 | 0 | 0 | 0 |
| 854 | 0 | 0 | 0 | 0 | 0 | 0 | 0 | 0 | 0 | 0 | 0 | ... | 0 | 1 | 1 | 0 | 0 | 0 | 0 |

FIG. 10

| INPUT DATA | 11 | 14 | 26 | 26 | 26 | 26 | 26 | 26 | 15 | 11 | ... | 72 | 243 | 243 | 72 | 34 | 11 | 11 |
|---|---|---|---|---|---|---|---|---|---|---|---|---|---|---|---|---|---|---|
| SCAN COUNT | 28 | 39 | 83 | 83 | 83 | 83 | 83 | 83 | 42 | 28 | ... | 275 | 1129 | 1129 | 275 | 114 | 28 | 28 |

FIG. 10A

| COUNT INDEX | | | | | | | | | | | | | | | | | | | | |
|---|---|---|---|---|---|---|---|---|---|---|---|---|---|---|---|---|---|---|---|---|
| 2 | | | | | | | | | | | | | | | | | | | | |
| 4 | | | | | | | | | | | | | | | | | | | | |
| 7 | | | | | | | | | | | | | | | | | | | | |
| 10 | | | | | | | | | | | | | | | | | | | | |
| ... | | | | | | | | | | | | | | | | | | | | |
| 28 | | | 1 | | | | | | | | | | | | | | | | | |
| ... | | | | | | | | | | | | | | | | | | | | |
| 39 | | | | 1 | | | | | | | | | | | | | | | | |
| ... | | | | | | | | | | | | | | | | | | | | |
| 42 | | | | | | | | | 1 | | | | | | | | | | | |
| ... | | | | | | | | | | | | | | | | | | | | |
| 83 | | | | | 1 | 1 | 1 | 1 | | | | | | | | | | | | |
| 114 | | | | | | | | | | | | | | | | | 1 | | | |
| ... | | | | | | | | | | | | | | | | | | | | |
| 275 | | | | | | | | | | | 1 | | | | | 1 | | | | |
| ... | | | | | | | | | | | | | | | | | | | | |
| 1129 | | | | | | | | | | | | 1 | 1 | | | | | | | |
| 1200 | | | | | | | | | | | | | | | | | | | | |

ELECTROLUMINESCENT LINE SCANNER WITH MOVEABLE FILTER

The present invention relates to image recording systems and methods and, more particularly, to an image recording system and attendant method for recording an image on a light-sensitive media.

Various systems have been developed for converting an image in electronic form into a visual form on photosensitive recording media such as positive slide film or self-developing film units. Such systems are useful for creating photographic slides for presenting information in an audio-visual context. In classic photocomposition and phototypesetting systems, the recording film is exposed on a character-by-character basis with images provided by a film master that carries numerous alphanumeric character forms and various graphic symbols. The master is moved, typically under computer control, to position a selected character or symbol between the photographic recording film and a light source to project the selected image onto the recording film. The system is best suited for textual composition, although masters having an inventory of user-selectable graphic characters can be used to 'build' complex graphics by appropriate juxtapositioning of the component graphics. Color images are obtained by interposing red, green, and blue filters in the path between the light source and the recording film to effect the desired color response on the recording film.

Since phototypesetting systems use a master image to expose the recording film, the resultant image formed on the recording film has high resolution characters with sharp, well focused edges. However, the ultimate image must be exposed on a character-by-character basis by moving the master to a number of successive positions, and, accordingly, the creation of complex images can be quite time-consuming. Since the resultant image is a function of the total number of available characters and graphic symbols on the master, it is difficult to create complex images with subtle gradations in color density.

In another system for creating an exposed photographic product, typically a color slide or a self-developing film unit, a monochrome cathode ray tube (CRT) projects its luminescent image through a moveable color wheel and associated optics to expose the positive slide film or the self-developing film unit. The electronic image is in digital form and is stored in a memory map with digital signals controlling each pixel of the CRT screen. The electronic signal is divided into the primary red, green, and blue color components of the image signal and the color component signals used to drive the CRT and the filter wheel in a sequential manner to effect a full color exposure. More specifically, the CRT is driven by the red component signal to provide a full frame monochrome image corresponding to the red component while the red filter is positioned between the luminescent screen and the recording film, by the green signal component while the green filter is positioned between the luminescent screen and the film, and by the blue signal component while the blue filter is in position between the CRT and the film.

The CRT/filter system is far more flexible in comparison to photocomposition systems in that complex graphic images and a greater range of color density variation can be obtained. However, the ultimate resolution of the system is a function of the resolution attained by the CRT, that is, the number of pixels available for image generation and the grey scale dynamic range of the monochrome CRT. In general, CRT-type imaging systems have a resolution that is less than that attainable by photocomposition systems.

SUMMARY OF THE INVENTION

In view of the above, it is an object of the present invention, among others, to provide a system and method for recording an image on a photosensitive media.

It is another object of the present invention, among others, to provide a system and method for recording an image on a photosensitive media in which high resolution is attained with a minimum of memory.

It is a further object of the present invention, among others, to provide a system and method for recording an image on a photosensitive media in which subtle changes and gradations in color density can be attained with a high degree precision and reproducibility.

In view of these objects, and others, the present invention provides a system and method for recording an image on a photosensitive media in which image information in digital form is received from an image data source, such as a personal computer or graphics workstation, and processed for imaging onto the recording film. The image data includes signals representative of the visual graphic structure of the image as well as the three primary colors. A luminescent image device is controlled in a successive sequential manner by the image data to sequentially expose the film through respective color filters to effect the desired exposure with the secondary colors generated by appropriated additive mixing of the primary colors. The image data controls the luminescent image device to effect exposures on a line-by-line basis with the luminescent intensity switched on and off as each line is generated with the image line repeated until all pixel positions on the recording film have been properly exposed.

In the preferred embodiment, the image recording system includes an electro-optic image section, an analog control section, and a digital control and processing section for processing the image data and controlling both the analog control and the electro-optic image sections to effect the desired exposure on the recording film. The electro-optic image section includes a luminescent display device, preferably a high-resolution monochromatic cathode ray tube (CRT) that directs its light output through a filter unit to the recording film contained within a camera. The recording film can take the form of positive roll film that is processed into slides or self-developing film units. The filter unit includes primary color filters, viz., red, green, and blue filters, to expose the film to appropriate colored light from the monochromatic CRT and a motor drive to selectively position each of the filters in the light path between the CRT and the recording film. The analog control section includes the necessary control and power supply services to control the CRT to sweep any single scan line at any specified line position while modulating the output light in a digital manner and repeating the line sweep until all pixel positions are properly exposed. The exposure of any pixel or line of pixels is the cumulative exposure of many scans at each pixel position so that very precise exposures can be effected to create developed images having fine gradations in color density and hue.

The image data is accepted by the digital processing section in a line-by-line format with each image data line including an exposure index value for each pixel in the line with the index values bounded by start-of-line and end-of-line character strings. The index values represent the desired color density of the exposed color and are converted into scan counts for the color to be imaged by a table look-up process for the particular recording film. The digital processing section controls the analog section and the electro-optic section to move the appropriate filter into position between the CRT and the recording film and then effects multiple horizontal line sweeps at the selected line position while modulating the light output of the CRT in a digital manner until all pixel positions for that line are properly imaged on the recording film. The scan count data for each line to be imaged can be processed in accordance with one of several modes including a mode in which the scan count data is stored in a line data buffer and a bit map is created in another buffer with a binary one provided in the buffer for each scan count value in the line data buffer having a value greater than zero. The bit map is loaded into a shift register and serially shifted to a modulator that digitally controls the CRT beam in an ON/OFF manner as the beam sweeps across the CRT screen. When the first sweep is completed, each scan count in the scan count buffer is decremented by one, and another bit map is created to control the beam on the second sweep for that line position. The process is continued until all scan counts in the scan count buffer are zero to complete the series of exposure sweeps for that line. Thereafter, the exposure of the next and all successive lines is effected to complete the image scan for the first color. The filter unit is then controlled to place the next color filter in the light path between the CRT and the recording film, and the procedure repeated until all lines for all colors are imaged. In addition to the decrement-by-one procedure, scanning can be accomplished by successively ascertaining the numeric difference between the highest scan count value and the next highest scan count value in the scan count buffer, creating the bit map in the shift register, repeatedly controlling the CRT sweep for a number of sweeps equal to the ascertained numeric difference, decrementing the scan count values by the numeric difference, and repeating the procedure until all scan count values are zero. If desired, a bit map table can be created containing all the possible bit maps for all the scans and then each bit map can be used to drive the CRT during the successive line sweeps until all exposures are effected for that line.

The present invention advantageously provides a film recording system and method by which recording film can be exposed to create high-resolution images in which precise control of the color density can be obtained in a time and cost efficient manner.

Other objects and further scope of applicability of the present invention will become apparent from the detailed description to follow, taken in conjunction with the accompanying drawings, in which like parts are designated by like reference characters.

DESCRIPTION OF THE DRAWING

FIG. 6 is a representative image of a color table containing index and scan values for a particular recording film;

FIG. 7 illustrates the data format of an image data line;

FIG. 7B is an exemplary image data line in accordance with the format presented in FIG. 7A;

FIG. 7C is an exemplary image data line that utilizes run-length encoding to effect a measure of data transmission efficiency;

FIG. 8 represents the contents of image data line and a scan count buffer for the data line of FIG. 7A;

FIG. 8A represents the contents of a first bit map for the scan count buffer of FIG. 8;

FIG. 8B represents the contents of the scan count buffer of FIG. 8 with each scan count decremented by one;

FIG. 8C represents selected bit maps for the scan count buffer of FIG. 8;

FIG. 9 represents the contents of image data line and scan count buffers for the data line of FIG. 7A;

FIG. 9A represents exemplary bit maps for the scan count information of FIG. 9 processed in accordance with the control sequence of FIGS. 5 and 5B;

FIG. 10 represents the contents of the image data line and scan count buffers for the data line of FIG. 7A;

FIG. 10A is a first bit map table for the image data line and scan count buffer information of FIG. 10; and FIG. 10B is a completed bit map table for the scan counter buffer information of FIG. 10.

DESCRIPTION OF THE PREFERRED EMBODIMENT

Figure 1:
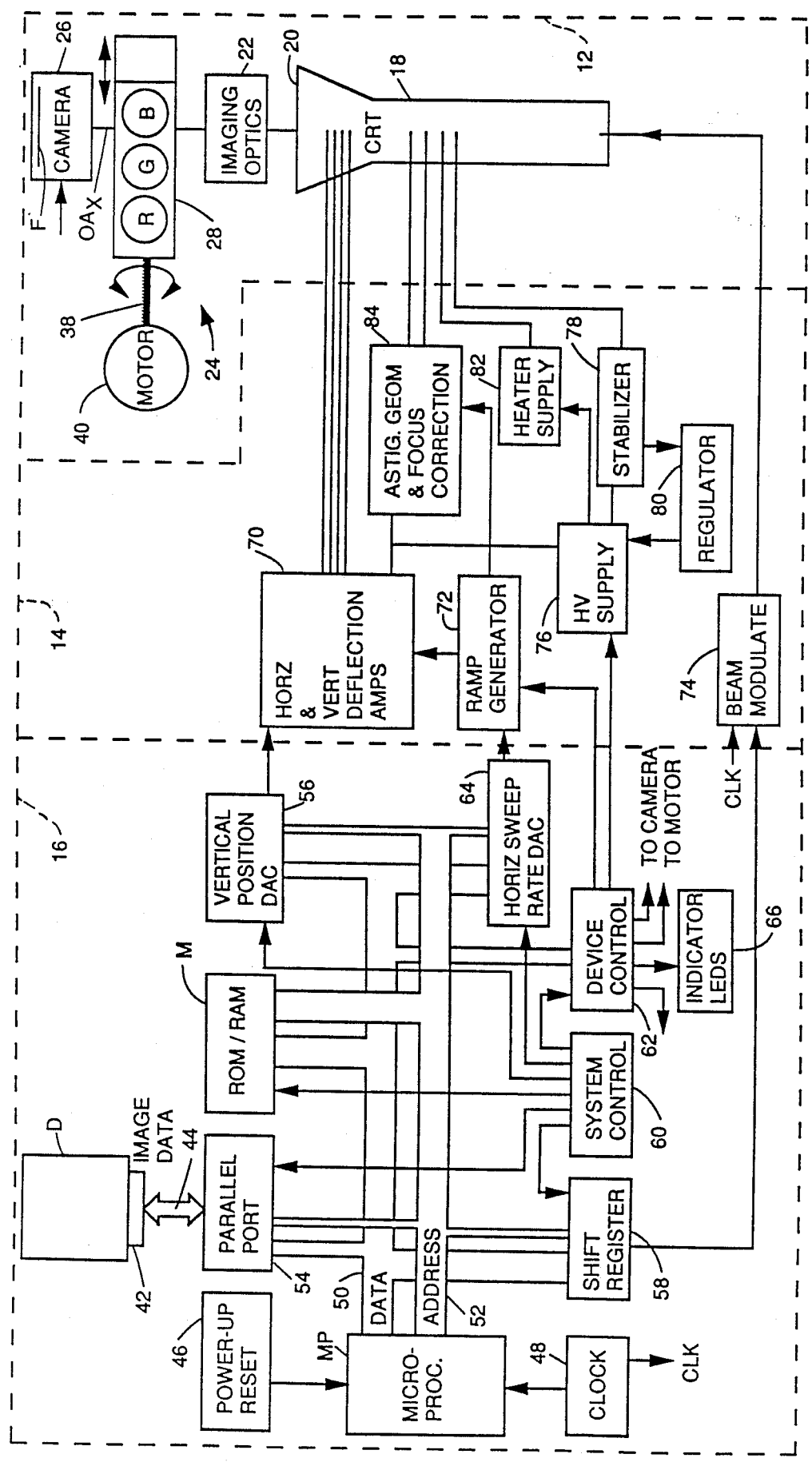
FIG. 1 is a functional block diagram of the overall organization of an image recording system in accordance with the present invention.

An image recording system in accordance with the present invention is shown in schematic form in FIG. 1 and is designated generally therein by the reference character 10. As shown, the system 10 includes an electro-optic imaging section 12, an analog controller 14, and an digital processing and control section 16.

The electro-optic imaging section 12 functions to generate a succession of luminescent line images that are imaged through red, green, and blue filters onto the recording film which may take the form of positive roll film from which individual slides are made, or the recording film F may take the form of self-developing positive film units. The electro-optic imaging section 12 includes an image device 18 that provides luminescent line images on a screen 20, imaging optics 22 for directing the optical output of the image device 18 along an optical axis $OA_x$, a selectively controllable filter unit 24 for filtering the optical output of the image device 18 and a camera 26 that contains the recording film F upon which the desired image is exposed.

Figure 2:
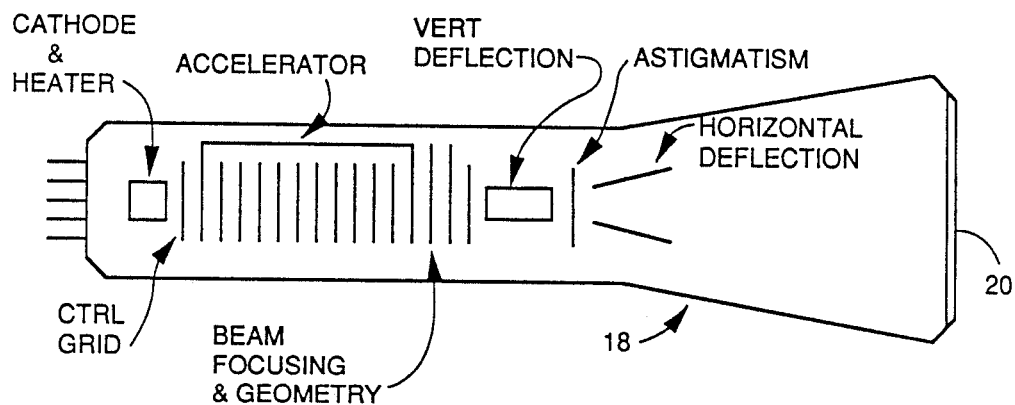
FIG. 2 is a side elevational view, in schematic cross-section, of a cathode ray tube (CRT) imaging device.
Figure 3:
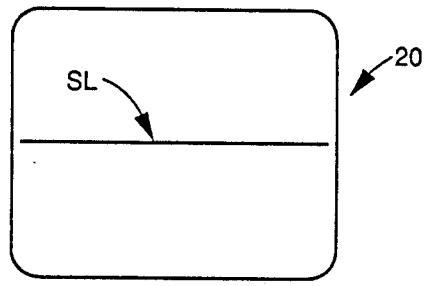
FIG. 3 is a front view of the display screen of the CRT of FIG. 2.

In the preferred embodiment, the image device 18 takes the form of a cathode-ray tube (CRT) having, as shown in schematic form in FIG. 2, a cathode and heater structure for developing an electron beam, a control grid, accelerator electrodes, beam focusing and geometry correction plates, a set of vertical electrostatic deflection plates, an astigmatism correction element, and a set of horizontal electrostatic deflection plates. The various electrodes, elements, and plates function to direct the electron beam to produce a desired luminescent image on the phosphor-coated screen 20. As shown in FIG. 3, the screen 20 is generally rectangular with a 3:4 height-to-width aspect ratio with the CRT controlled, as explained below, to write a succession of horizontal scan lines SL at varying vertical line positions with the scan lines SL having a selected number of pixels per line. In the preferred embodiment, the CRT is a model 35001 tube supplied by Chromaline Technologies of Los Altos, Calif. 94022. While the preferred embodiment utilizes a CRT to develop a luminescent output for exposing the recording film F, other functionally equivalent devices are also suitable, including light-emitting flat panel displays and other directed beam devices in which a narrow spot of light can be controlled to illuminate successive portions of the recording film F. The imaging optics 22 take the form of a lens unit and mirror (not specifically shown) which focuses and redirects the output of the image device 18 to the recording film F.

Figure 4:
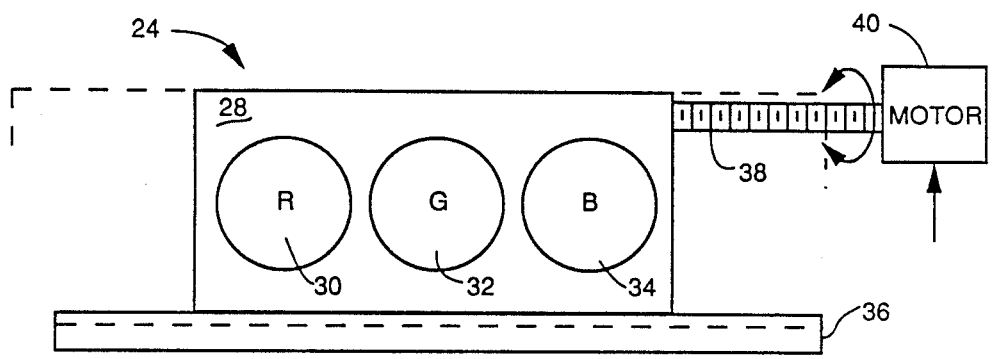
FIG. 4 is a front elevational view of a filter unit for imaging light from the screen of FIG. 3 onto recording film.

The filter unit 24 is designed to optically filter the luminescent output of the image device 18 through red, green, and blue filters. In the preferred embodiment, the filter unit 24 takes the form, as shown in FIG. 4, of an rectangular, opaque mask 28 that includes translucent filter panels 30, 32, and 34 that are defined, respectively, by red, green, and blue optical filtering media. The lower edge of the mask 28 is slidably mounted in a slotted track 36 for movement to the left and the right as defined by the dotted line outline to position a selected one of the filter panels on the optical axis $OA_x$. The mask 28 is moved between its positions by a rotatably mounted leadscrew 38 that is in threaded engagement with an internally threaded portion (not shown) of the mask 28 and is selectively bidirectionally rotated by a motor 40 under the control of the digital processing and control section 16. While the mask 28 of FIG. 4 is preferred, other filter positioning structures, including rotatable filter wheel assemblies, are likewise suitable.

The configuration of the camera 26 is a function of the type of recording film F utilized. Where the image is to be recorded onto 35 mm. roll film, the camera 26 is preferably a conventional 35 mm. camera of the type that has a shutter that can be selectively opened and closed in response to appropriate commands and which advances the film in response a command or under the control of its own internal operating cycle. While a number of cameras having these attributes are suitable, preferred cameras include the Konica FT-1 camera. Where the image is to be recorded onto self-developing film units, such as SX-70 film marketed by the Polaroid Corporation of Cambridge, Mass. 02319, a camera having an accessory film back for accepting the film packs is used.

The digital processing and control section 16 functions to accept an image signal from an image data source D and provide image and control signals to both the electro-optic imaging section 12 and the analog controller 14. The image data source D is typically a micro computer, such as a MacIntosh II computer or an IBM PC, with appropriate graphic image generation capability. In the case of the MacIntosh II computer, the graphics image signals are interfaced to the digital processing and control section 16 through a SCSI (Small Computer Standard Interface) port and, in the case of an IBM PC, the graphics image signals are interfaced to the digital processing and control section 16 through the bi-directional parallel printer port, indicated at 42 in FIG. 1. Although the data transfer can be effected in a serial manner, parallel data transfer is preferred. In the case of the IBM PC, suitable graphics hardware and software include the TARGA videographics system and the TIPS Imaging Software marketed by the AT&T corporation. The TARGA image signals, including various control, information, and sequence signals are downloadable from the image data source D through the parallel port 42 via a connection path 44 to the digital processing and control section 16 for processing to produce the desired image on the recording film F.

The digital processing and control section 16 includes a microprocessor MP that is powered-up in response to a power-up controller 46 and which receives its clocking signal CLK from a clock 48 and communicates with various functional devices along a data bus 50 and an address bus 52. The microprocessor MP communicates with a parallel port 54 that receives downloaded image information from the image data source D, a memory M that includes both read only memory (ROM) and random access memory (RAM), a vertical position digital-to-analog converter 56, a shift register 58 that contains scan line information for controlling the image device 18, a system controller 60, a device controller 62 for providing control signals to the electro-optic imaging section 12 and the analog controller 14, and a horizontal sweep-rate digital-to-analog converter 64.

The microprocessor MP is preferably a MC68000 microprocessor supplied by Motorola Integrated Circuits, Austin Tex. 78721, this processor including 16 general purpose registers and an ALU and, in the illustrated embodiment, is driven by the clock 48 at a 8 MHz rate. The microprocessor MP operates in response to the control programs described below in FIGS. 5, 5A, 5B, and 5C and the system controller 60 to accept control and image data information through the parallel port 54 from the image data source D and process the data to expose the desired image on the recording film F. The memory M includes ROM that contains the pre-programmed instruction sequence as well as RAM for storing control and image data provided along the data bus 50 and providing processed image and control data to the data bus 50. The shift register 58 accepts bit map binary information representative of a single scan line SL and, as explained below, uses the bit map to modulate the image device 18. The system controller 60 functions to provide control and select signals to the various other devices on the data and address busses 50 and 52 including the device controller 62 that provides control signals to the camera 26 and the motor 40 of the filter unit 24, described above in relationship to FIG. 4, to various LED status display indicators 66, and to the digital-to-analog converters 56 and 64. The vertical position digital-to-analog converter 56 functions in response to a digital control signal provided on the data bus 50 to provide an analog signal to the analog controller 14 to control the vertical position of the scan line SL on the screen 20 of the image device 18. In a similar manner, the horizontal sweep rate digital-to-analog converter 64 functions in response to a digital control signal provided on the data bus 50 to provide an analog signal to the analog controller 14 to control the horizontal sweep rate of the scan line SL on the screen 20 of the image device 18.

The analog controller 14 functions as an interface between the digital processing and control section 16 and the electro-optic imaging section 12 to convert the digital control signals to an analog control format. The analog controller 14 includes horizontal and vertical deflection amplifiers 70 that provide deflection voltages to the horizontal and vertical electrostatic deflection plates of the image device 18 (FIG. 2), a ramp generator 72 that develops the horizontal sweep voltage for moving the electron beam across the screen 20, and a controllable modulator 74 that modulates the electron beam (viz., the Z axis) in response to the serial output of the shift register 58. In addition, the analog controller 14 includes a heater supply 82, a focus and astigmatism controller 84, and a high voltage supply 76 that provides a voltage stabilized output through a stabilizer 78, the output of which is controlled through a regulator 80.

Figure 5:
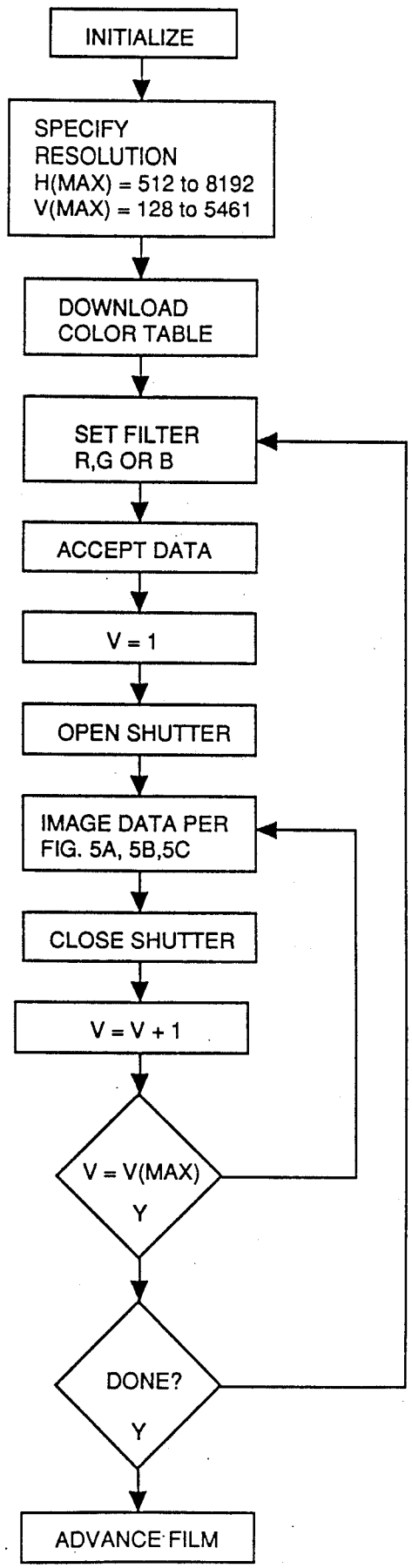
FIG. 5 is flow diagram illustrating the overall control sequence of the image recording system of the present invention.
Figure 5A:
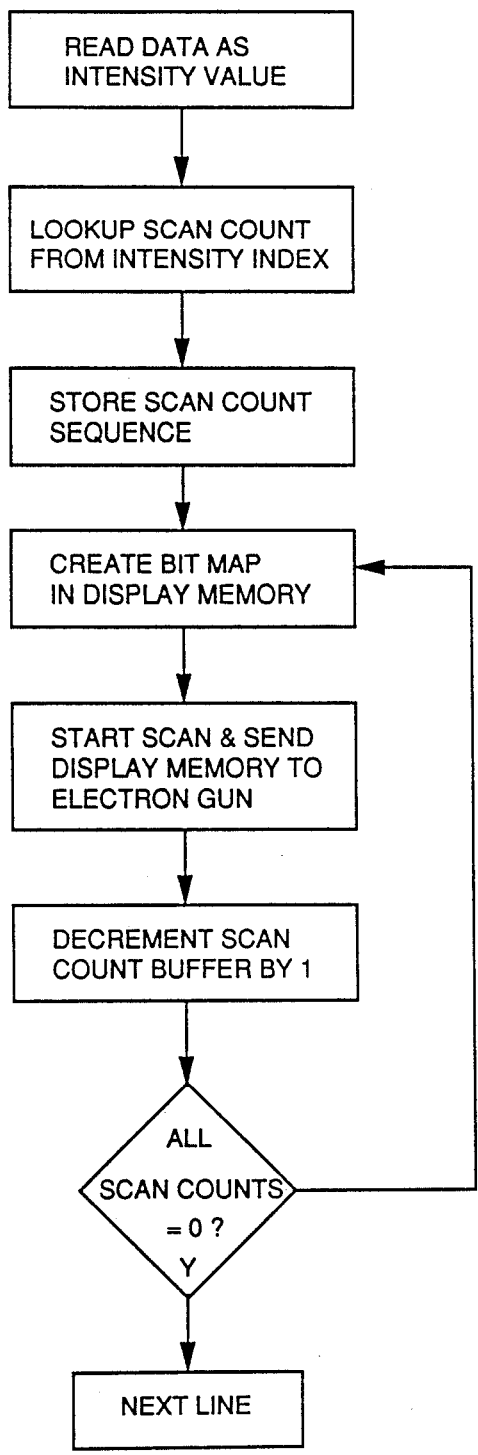
FIG. 5A flow diagram illustrating one mode for processing an image data line to effect exposure of the recording film.
Figure 5B:
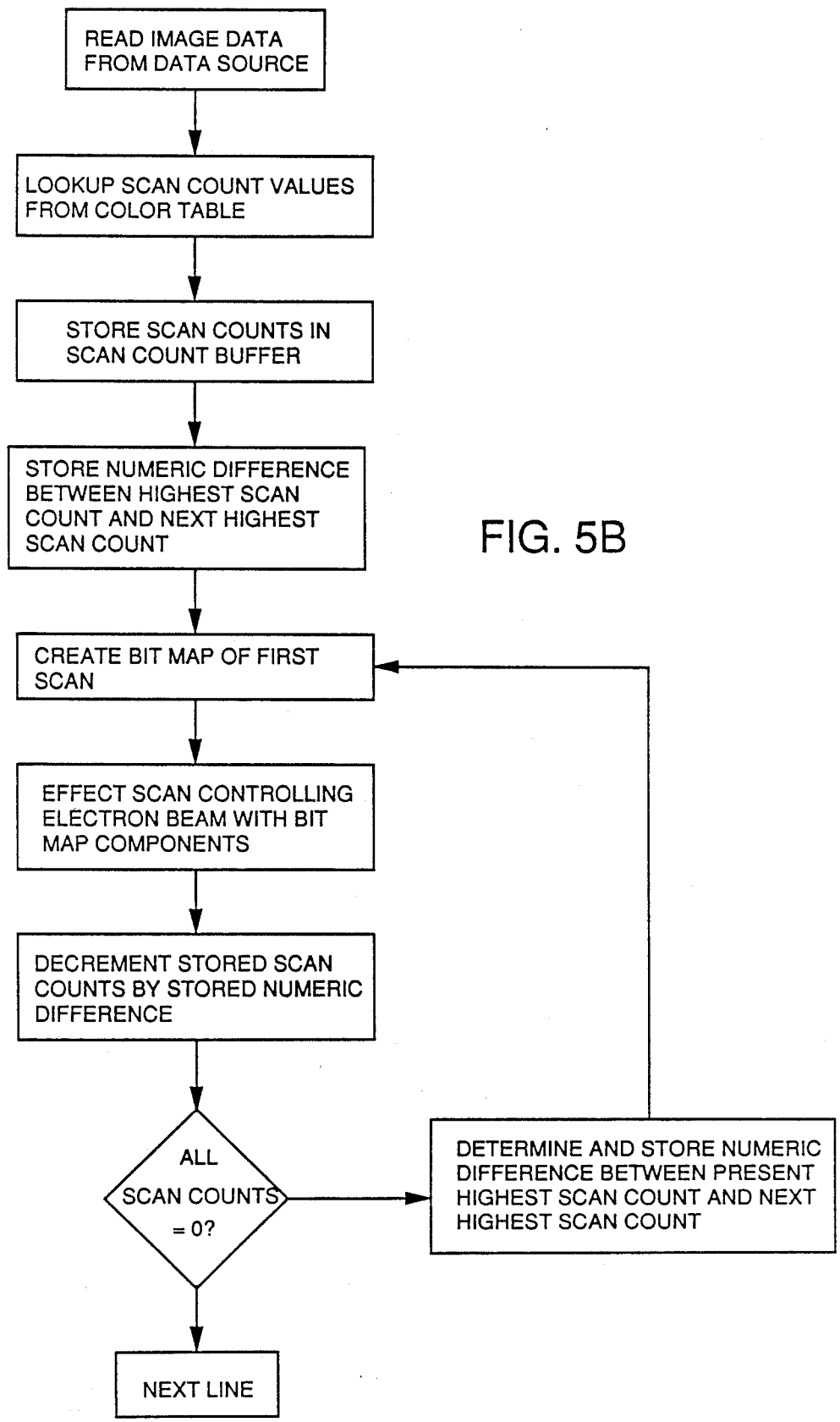
FIG. 5B flow diagram illustrating a second mode for processing an image data line to effect exposure of the recording film.
Figure 5C:
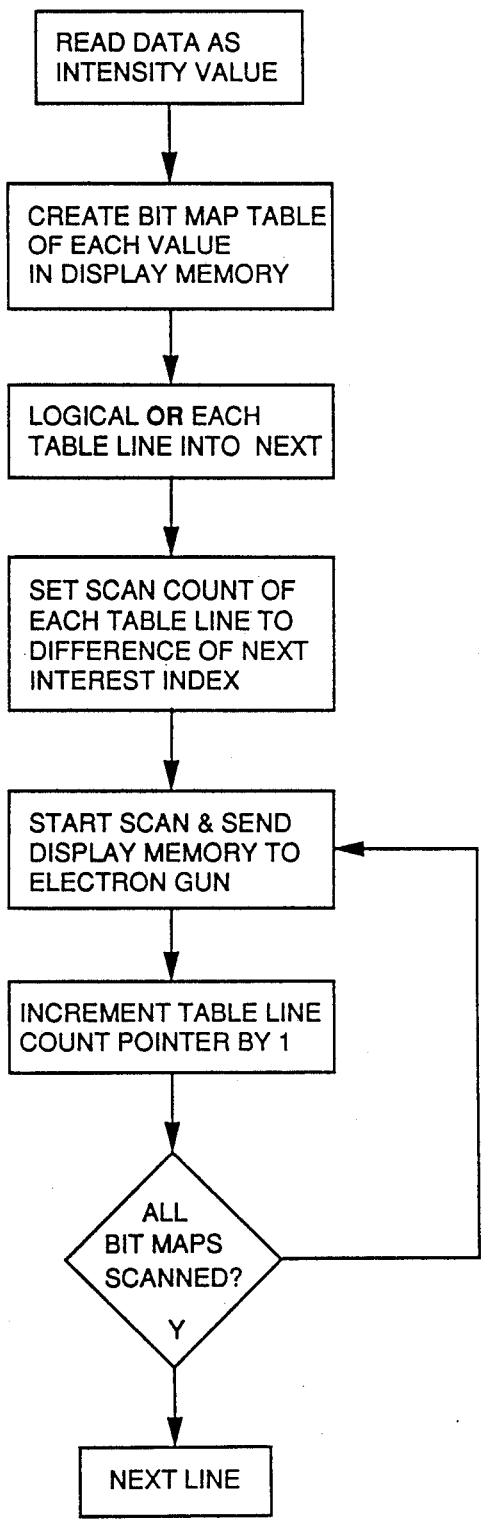
FIG. 5C is flow diagram illustrating a third mode for processing an image data line to effect exposure of the recording film.

The image recording system 10 operates in accordance with the flow diagram of FIG. 5 and one of the data modes of FIGS. 5A, 5B, and 5C to produce the desired image on the recording film F. As shown in FIG. 5, the image recording system 10 is initialized, for example, by clearing a number of data registers and initializing variables and counters. Thereafter the resolution of the recorded image, as defined by the number of pixels per each line $H_n$ and the total number of lines per image $V_n$, is specified with these values held in appropriate memory or register locations to control memory allocation. In general, the resolution of the image recorded on the recording film F can be specified by the operator of the image data source D, or, in the absence of a user-specified resolution, can default to preselected values. In the preferred embodiment, the horizontal resolution $H_n$ varies between a minimum of 512 pixels per line and a maximum of 8192 pixels per line with a fault value of 2048 pixels, and the number of vertical lines $V_n$ varies from a minimum of 128 lines per image to a maximum of 5461 lines per image with a default value of 1366 lines. As can be appreciated, the image device 18 has sufficient focus acuity to produce the full range of images.

After the image resolution is specified, a color table for the particular recording film F is downloaded from the image data source D into the memory M. Each film has a particular red, green, and blue response characteristic for the actinic radiation provided from the image device 18, and, in this regard, the image recording system 10 is provided with the film response characteristics to produce the desired image. An exemplary color table, as shown in FIG. 6, includes an exposure index column and corresponding scan number values for the red, green, and blue exposures. In the preferred embodiment, the exposure index is an 8-bit binary representation having 256 possible values (0–255). The scan number values, as explained more fully below, represent the number of scans that must be made for a particular scan line to effect the desired exposure for the specified index value. For example, for an index value of 253, a pixel must be illuminated 1189 times to effect the desired red color density for the particular recording film F, 713 times to effect the desired green color density exposure, and 1833 times to effect the desired blue color density exposure. The scan number values in the color table are a function, in part, of the actinic response of the recording film F, the luminescent output of the image device 18, and the attenuation of the red, green, and blue filters 30, 32, and 34 (FIG. 4).

Once the color table is downloaded, the filter unit 24 is controlled to place the first filter of the red, green, and blue filters in position in the optical axis $OA_x$. In the preferred embodiment, the recording film F is sequentially exposed to light through the red filter, through the green filter, and, lastly, through the blue filter. The red filter 30 is placed in position by an appropriate command to the motor 40 from the device controller 62 which, in turn, receives its instructions from the system controller 60 and the microprocessor MP through the data bus 50.

After the filter unit 24 is controlled to place the red filter 30 in position, an 'accept data' signal is provided through the parallel port 54 to the image data source D, a counter V (representing the line number) is set to 1 to indicate that data for the first line is being imaged. For a line position V=1, the digital signal representation is converted by the vertical position digital-to-analog controller 56 (FIG. 1) to provide an appropriate analog control signal to the deflection amplifiers 70 which, in turn, provide the appropriate voltage to the vertical deflection plates (FIG. 2) to write a scan line at line position 1 at the top of the screen 20 (FIG. 3). As the vertical line position register is successively incremented, the scan line SL will be written at successively lower locations on the screen until the last scan line ($V_{max}$) is written at the lower end of the screen 20.

The image data is sent from the image data source D through the data path that includes the parallel port 42, the connection path 44, and the parallel port 54 to the digital processing and control section 16 in a line-by-line data format. As explained below, the image data for the lines of the initial red exposure are sent, the image recording system 10 is re-configured for the green filter and the image data lines for the green exposure are sent, and, lastly, the system is re-configured for the blue exposure and the image data lines for the blue exposure are sent.

As shown in FIG. 7A, the line data format includes a start-of-line marker SOL to indicate the start of the data line and an end-of-line marker EOL with a series of index values $NDX_n$ for the currently imaged color between the start and end markers, SOL and EOL. The start-of-line marker SOL and the end-of-line marker EOL are arbitrarily selected character and as shown in the example image data line of FIGS. 7A and 7B, are defined by character strings (XX) and (00). The total length of the image data line, in terms of the start-of-line marker SOL, the index values, and the end-of-line marker EOL is a function of the initially selected horizontal resolution $H_n$, that is, the total number of pixels per line. Thus for a horizontal resolution value of 2048 (the default value), the image line would include 2048 successive index bytes $NDX_1 \ldots NDX_{2048}$ bounded by the start-of-line and end-of-line markers SOL and EOL. In many image lines, substantial portions of the image line can be subjected to run-length data encoding that increases the data throughput and effects a measure of data compression and processing efficiency. For example, a single-color background or foreground image line can include the start-of-line marker SOL and the end-of-line marker EOL with 2048 identical index values. In order to effect the data encoding, a same-value data frame is inserted into the image line data. The same-value data frame includes a frame marker, a value indicating the total number of same-value index values, and the value of the index. For example and as shown in FIG. 7A, the data line includes the start-of-line marker SOL, a first index byte having a decimal 11 value, a second index byte having a decimal 14 value, and seven successive index value bytes of decimal 26. As shown in FIG. 7B, a measure of data compression is provided for the seven same-value index bytes by inserting a frame marker (CC) after the second index byte, a decimal 7 byte indicating that the next seven successive index bytes are of the same value, and, lastly, an index value byte of decimal 26 indicating that the seven successive bytes after the appearance of the frame marker (CC) have a decimal value of 26.

Once image data is accepted as shown in FIG. 5, the shutter of the camera 26 is opened in response to a command from the device controller 62 and the data is imaged onto the recording film F in accordance with the control sequences of FIGS. 5A, 5B, or 5C, as explained below. As each line is imaged, the line counter V is incremented by one. Once the V image lines for the first color are imaged and the vertical line counter reaches the specified line value $V_{max}$, as shown in FIG. 5, the next filter in the sequence, that is, the green filter 32, is positioned in the optical axis $OA_x$, the line counter V is reset to one, and the sequence is repeated until the image lines from $V_1$ to $V_{max}$ are imaged. The sequence is then repeated for the blue filter 34. After the three color signals are imaged, the imaging sequence is completed and an appropriate control signal is sent to the camera 26 to close the shutter and advance the recording film F one frame.

The image data lines can be used to control the image devices using one of three control sequences presented in FIGS. 5A, 5B, or 5C to produce the succession of scan lines SL that expose each line $V_n$ on the recording film F. In general, the control sequences create a bit map that is loaded into the shift register 58 with the contents of the shift register 58 serially outputted in synchronism with the clock 48 to provide a bit string that controls the modulator 74 to turn the electron beam on and off in digital fashion during its horizontal sweep to effect exposure of the recording film F.

A first control sequence for effecting the imaging of the line data is shown in FIG. 5A. As shown, the data of a single scan line SL, as represented in FIG. 7A for example, is converted to a set of scan values a table look-up process by which the individual index values are compared to the index values on the previously downloaded color table (FIG. 6) and corresponding scan count values are obtained. For the exemplary data line of FIG. 7B, the index values of which are shown on the line labelled 'input data' of FIG. 8, the corresponding scan count values for the red exposure, are shown on the line labelled 'scan count' in FIG. 8. The scan count values are stored in an appropriate memory buffer or register in the memory M. A corresponding bit map buffer, represented in FIG. 8A, is then generated having the same number of locations as that of the scan count buffer and containing a binary one for each corresponding scan count having a value greater than zero and a binary zero for each corresponding scan count having a value of zero. The bit map is transferred by the microprocessor MP through the data bus 50 and parallel loaded into the shift register 58. At the start of the first sweep, the binary ones and zeros of the bit map are serially clocked from the output of the shift register 58 to the modulator 74 while the ramp generator 72 and deflection amplifiers 70 are controlled in response to the clock 48 and the device controller 62 to start the horizontal sweep across the screen 20. As the electron beam sweeps from one side to the other, the beam is periodically turned on and off in response to the serial progression of binary ones and zeros driving the modulator 74 to illuminate selected pixels corresponding to the binary one information contents of the bit map and thus provide light to expose the recording film F through the selected filter. At the conclusion of the sweep, at which time the entire bit map will have been shifted out of the shift register 58 to drive the modulator 74, the ramp generator 72 is reset to start the second scan.

The contents of the scan count buffer are then decremented by one for each non-zero value, as shown in FIG. 8B. Thereafter, another bit map buffer is generated containing a binary one for each corresponding scan count having a value greater than zero and a binary zero for each corresponding scan count having a value of zero. The bit map is transferred by the microprocessor MP through the data bus 50 and parallel loaded into the shift register 58. At the start of the second sweep, the binary ones and zeros of the bit map are serially clocked from the output of the shift register 58 to the modulator 74 while the ramp generator 72 and deflection amplifiers 70 are controlled in response to the clock 48 and the device controller 62 to start the second horizontal sweep across the screen 20 for the line to again effect an exposure of the recording film through the selected filter.

The above process is repeated in a recurring manner, that is, the generation of the bit map from the contents of the scan count buffer, the driving of the modulator 74 during each sweep in response to the bit map, and the decrementing of the scan count buffer contents until all scan counts are zero. At that time the exposure of that single scan line SL for the selected color will have been completed. Since the exemplary data of FIG. 8 has two locations with a scan count of 1129, the above process will be repeated for 1129 scans until all scan counts in the scan count buffer are counted-down to zero. Representative bit maps for selected of the scans are shown in FIG. 8C, and, as shown, the binary one values in the bit map will change to binary zero as the scan count in the scan count buffer for that position decrements to zero.

After the entire line is imaged by the multiple scans, the program sequence returns to the control sequence of FIG. 5 and the vertical line counter V is incremented by 1 and the process of FIG. 5A is repeated until all the scan lines (i.e., $V=V_{max}$) are imaged. Thereafter, the filter unit 24 is reconfigured to place the second filter, in this case, the green filter 34 into the optical axis repeat the process.

As can be appreciated from the above, the system and method of the present invention provides for exposure of the recording film F in small digitally controlled values by repeatedly scanning the same line $V_n$ until all pixel positions are properly exposed to allow precise control of the color density of the exposed film. For example, a recording film having a dynamic exposure range of 256 possible variations can be precisely exposed for each of those values by repeated scanning for the appropriate number of scans determined by the color table. Thus, it is possible to achieve very gradual and subtle gradation in color density on the recording film F. As can be appreciated, an even greater degree of exposure precision can be achieved by increasing the possible number of index values upwardly from the 256 values presented above.

In the example described above for FIGS. 5 and 5A, the contents of the scan count buffer are successively decremented by one until the scan counts are zero. In many types of graphic images in which there are no subtle changes in hue or color density, a measure of processing efficiency is obtained by creating a bit map in the shift register 58 and then determining the numeric difference between the highest scan count and the next highest scan. The contents of the shift register 58 are then read out in a recurring manner for a number of cycles equal to the previously determined numeric difference, and the scan counts in the scan count buffer are then decremented by the numeric difference rather than by one in the case of the control sequence shown in FIGS. 5 and 5A. This procedure eliminates the re-determination of the bit map after each decrement-by-one cycle of the control sequence of FIGS. 5 and 5A.

More specifically and as shown in FIG. 5B and the index and scan count values of FIG. 9, the highest scan count is 1129 (corresponding to an index value of 243) and the next highest scan count is 275 (corresponding to an index value of 72). As shown in FIG. 5B, the data of a single scan line SL, as represented in FIG. 9, for example, is converted to a set of scan values by the table look-up process by which the individual index values are compared to the index values on the previously downloaded color table (FIG. 6) and corresponding scan count values are obtained. For the exemplary data line of FIG. 7A, the index values of which are shown on the line labelled 'input data' of FIG. 9, the corresponding scan count values for the red exposure, are shown on the line labelled 'scan count' in FIG. 9. The scan count values are stored in an appropriate memory buffer or register in the memory M. A corresponding bit map buffer is then generated having the same number of locations as that of the scan count buffer and containing a binary one for each corresponding scan count having a value greater than zero and a binary zero for each corresponding scan count having a value of zero. The bit map is transferred by the microprocessor MP through the data bus 50 and parallel loaded into the shift register 58. The numeric difference between the highest scan count (i.e., 1129 in FIG. 9) and the next highest scan (i.e., 275 in FIG. 9) is then determined, this value being equal to 854, and is stored by the microprocessor MP for subsequent control of the shift register 58. At the start of the first sweep, the binary ones and zeros of the bit map are serially clocked from the output of the shift register 58 to the modulator 74 while the ramp generator 72 and deflection amplifiers 70 are controlled in response to the clock 48 and the device controller 62 to start the horizontal sweep across the screen 20.

As the electron beam sweeps from one side to the other, the beam is periodically turned on and off in response to the serial progression of binary ones and zeros driving the modulator 74 to illuminate selected pixels corresponding to the binary one information contents of the bit map and thus provide light to expose the recording film F through the selected filter. At the conclusion of the first sweep by the electron beam, the numeric difference value is decremented by one (i.e., 853), the shift register 58 is re-loaded with the bit map, and the contents again shifted to the modulator 74. This procedure is repeated until the stored numeric difference value becomes zero at which time the scan counts in the scan count buffer are decremented by the original numeric difference (i.e., 854) and a new bit map is generated. As shown in FIG. 9A, only seven discrete bit maps need be generated for the data shown in FIG. 9. The control sequence represented by FIGS. 5 and 5B is preferred to the decrement-by-one sequence of FIG. 5A since processing time is saved where there are relatively few sets of unique color density values, and, additionally, the sequence of FIG. 5B will also accommodate images having a large number of small color density variations.

Figure 10B:
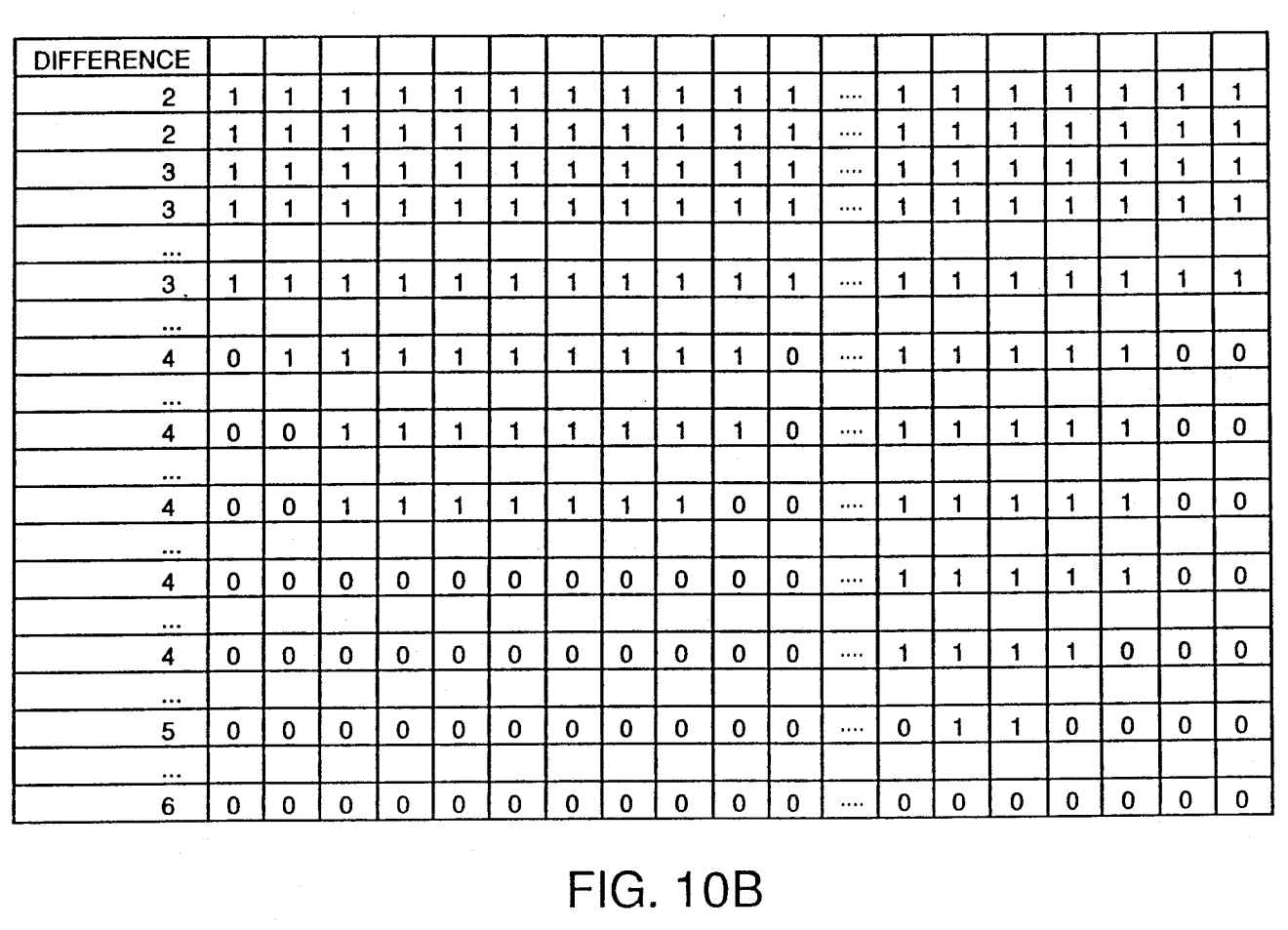

In the control sequences of FIGS. 5 and 5A and 5B, the various bit maps are created and the scan lines are executed on an interleaved basis, that is, a bit map is created and one scan line (FIG. 5A) or more than one scan line (FIG. 5B) are executed with the procedure continuing until the scan count values in the scan count buffer are decremented to zero for that image line. An alternate control sequence allowing the formation of a bit map table or matrix containing all the image data for the image line prior the execution of any scan lines SL is shown in FIG. 5C with the corresponding index and scan count values and bit map tables shown in FIGS. 10 and 10A. As shown in FIG. 5C, a bit map is created having a bit width equal to the number of scan counts for the horizontal resolution H and a depth equal to the highest possible scan count for the particular color being imaged. In the case of red and as shown in the color table of FIG. 6 and in the left column of FIG. 10A, the bit map table is configured to a maximum scan count of 1200. After the bit map table is created, the value of each scan count is queried and a binary one is placed in the location (i.e., the row) corresponding to that value. In the case of the two adjacent scan counts 1129 shown in FIG. 10, a binary one value is placed in the two adjacent locations in the 1129 row buffer. After the binary one values are placed in the appropriate locations, as represented in FIG. 10A, all the lower scan count values in the table are filled by logically OR'ing the highest scan count value with its immediate lower value until the entire bit map table is filled as indicated in FIG. 10B.

Once the bit map table is filled, the contents can be used to control the analog controller 14 and the elrctro-optic imaging section 12 in one or more modes. For example, the individual bit maps in the table can be transferred in sequential order through the data bus 50 to the shift register 58 to control successive electron beam sweeps until all the bit maps have been processed and all the sweeps for that line completed. In addition, the bit map table can be queried to identify those bit maps that have identical bit patterns and provide a numeric value for each set of identical bit maps. The bit map table is then reconfigured to include only one of each of the unique bit maps and a numeric value indicating the number of repeat scans that must be effected for that bit map in a manner analogous to that of FIGS. 5 and 5B. Thus a unique bit map would be read from the bit map table to the shift register 58 and used to control the electron beam during its sweep a selected number of times and then the next successive unique bit map would be read to the shift register 58. In addition, a counter can be set to count the total number of scans and each successive unique bit map can used to control the electron beam of the image device 18 by the difference value between the contents of the counter and number of scans for that bit map shown in FIG. 10B.

The present invention advantageously provides a film recording system and method by which recording film is exposed to produce high resolution images in which precise control of the color density can be obtained in a time and cost efficient manner. Since each line of the image is scanned many times in a digitally controlled manner, the light provided by each pixel can be controlled in a precise incremental manner until the desired exposure is obtained. Thus subtle changes of in color density and hue can be obtained on a pixel-by-pixel basis.

As will be apparent to those skilled in the art, various changes and modifications may be made to the illustrated image recording system and method of the present invention without departing from the spirit and scope of the invention as determined in the appended claims and their legal equivalent.

What is claimed is:

1. A film recorder system for effecting an exposure of photographic film, comprising:
   means for producing a two-level light spot controllable to effect S successive scans of each of N lines that define an image field, each line defined by P pixel locations, where N=1, 2, 3, ..., $N_{max}$ and where S=0, 1, 2, 3, ..., $S_{max}$;
   means for supporting photographic film within the image field for exposure thereof by the light spot of said first-mentioned means; and
   means for controlling said first-mentioned means to effect S successive scans of each of the N lines of the image field in response to a digital representation of the image for which an exposure is to be made, said means for controlling including a memory having a bit map for controlling the exposure of the N lines, the bit map having a bit width equal to the P pixel locations of the lines, the memory position for the maximum scan value $S_{max}$ for each of the P pixel locations for the lines containing a control bit to effect exposure and all memory positions for each of the P pixel locations less than the maximum scan value $S_{max}$ position containing a control bit to effect exposure provided by successively OR'ing the control bit contents of the maximum scan value $S_{max}$ position with the control bit contents of the immediately lower value scan memory position.

2. The film recorder system for effecting an exposure of photographic film of claim 1, further comprising:
   filter means having at least two optical wavelength bandpass filters selectively positionable between said first- and second-mentioned means to provide light of a first and other wavelength to the photographic film to effect an exposure thereof;
   said control means selectively controlling said filter means to position said first bandpass filter between said first- and second-mentioned means and controlling said first-mentioned means to effect S successive scans of the N scan lines of the image field in response to a digital representation of the image at the first wavelength and controlling said filter means to position the other of said bandpass filters between said first- and second-mentioned means and controlling said first-mentioned means to effect S successive scans of the N scan lines of the image field in response to a digital representation of the image at the other wavelength.

3. The film recorder system for effecting an image-wise exposure of photographic film of claim 1, wherein said third-mentioned means controls said first-mentioned means to effect exposure of adjacent scan lines until the $N_{max}$ scan lines of the image field are exposed.

4. A system for exposing a photosensitive recording medial to form an image-exposure thereon, comprising:
   means for producing a radiation spot having a controllable bi-state intensity and controllable to effect S successive scans of each of N lines that define an image field, each line defined by P pixel locations, where N 32 1, 2, 3, ..., $N_{max}$ and where S=0, 1, 2, 3, ... $S_{max}$;
   optical means for supporting a photosensitive recording media within the image field and for directing the radiation spot thereto to expose selected positions thereof; and
   means for controlling said first-mentioned means to effect S successive scans of each of the N lines of the image field in response to a digital representation of the image for which an exposure is to be made, said means for controlling including a memory having a bit map for controlling the exposure of the N lines, the bit map having a bit width equal to the P pixel locations of the lines, the memory position for the maximum scan value S? for each of the P pixel locations for the lines containing a control bit to effect exposure and all memory positions for each of the P pixel locations less than the maximum scan value $S_{max}$ position containing a ,control bit to effect exposure provided by successively OR'ing the control bit contents of the maximum scan value $S_{max}$ position with the control bit contents of the immediately lower value scan memory position.

5. The system for exposing a photosensitive recording media claim 4, further comprising:
   means for selectively positioning a selected one of at least two optical wavelength bandpass filters between said first- and second-mentioned means to provide actinic radiation of a first and other wavelength to the photosensitive recording media;
   said third-mentioned means selectively controlling said filter means to position a first bandpass filter between said first- and second-mentioned means and controlling said first-mentioned means to effect S successive scans of the N lines of the image in response to a digital representation of the image at the first wavelength, and controlling said filter means to position the other of said bandpass filters between said first- and second-mentioned means and controlling said first-mentioned means to effect S successive scans of the N lines of the image in response to the digital representation of the image at the other wavelength.

6. A film recorder for effecting image-wise exposure of a photographic film, comprising:
   a CRT means for producing a controllable ON/OFF actinic radiation spot on its screen and controllable to scan an image field defined by a succession of N lines thereacross, each line defined by P pixels;
   a camera means for accepting the actinic radiation from said CRT means and exposing photographic film therein;
   controllable filter means between said CRT means and said camera means for positioning a selected one of at least a first or second color filter therebetween; and means for controlling said CRT means to effect S successive scans of each of the N lines of the image field through a first of said first or second filters in response to a digital representation of the image for which an exposure is to be made and to effect S successive scan of each of the N lines of the image field through the second of said first or second filters in response to the digital representation of the image for which an exposure is to be made, said means for controlling including a memory having a bit map for controlling the exposure of the N lines, the bit map having a bit width equal to the P pixel locations of the lines, the memory position for the maximum can value $S_{max}$ for each of the P pixel locations for the lines containing a control bit to effect exposure and all memory positions for each of the P pixel locations less than the maximum scan value $S_{max}$ position containing a control bit to effect exposure provided by successively OR'ing the control bit contents of the maximum scan value $S_{max}$ position with the control bit contents of the immediately lower value scan memory position.

7. A method of effecting an image-wise exposure of photographic film, comprising the steps of:

forming a memory bit map of an image field of N lines of P pixels to be scanned S times to expose a photographic film, where $S = 0, 1, 2, 3, \ldots, S_{max}$, the bit map having a bit width equal to the P pixel locations of the lines, the memory position for the maximum scan value $S_{max}$ for each of the P pixel locations for the lines containing a control bit to effect exposure and all memory positions for each of the P pixel locations less than the maximum scan value $S_{max}$ position containing a control bit to effect exposure provided by successively OR'ing the control bit contents of the maximum scan value $S_{max}$ position with the control bit contents of the immediately lower value scan memory position;

producing an ON/OFF controllable actinic radiation spot for irradiating selected portions of a film plane;

controlling the radiation spot to effect S successive scans of the N scan lines in response to the bit map of the image for which an exposure is to be made.

8. The method of effecting an image-wise exposure of photographic film of claim 7, wherein said producing step further comprises:

producing an ON/OFF controllable actinic radiation spot of a first wavelength.

9. The method of effecting an image-wise exposure of photographic film of claim 8, further comprising the step of, subsequent to said second controlling step:

producing an ON/OFF controllable actinic radiation spot of a second wavelength.

* * * * *